(12) United States Patent
Zlokarnik

(10) Patent No.: US 7,877,255 B2
(45) Date of Patent: Jan. 25, 2011

(54) SPEECH RECOGNITION USING CHANNEL VERIFICATION

(75) Inventor: Igor Zlokarnik, Natick, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 1334 days.

(21) Appl. No.: 11/394,643

(22) Filed: Mar. 31, 2006

(65) Prior Publication Data

US 2007/0239448 A1    Oct. 11, 2007

(51) Int. Cl.
*G10L 15/04* (2006.01)
(52) U.S. Cl. .............. 704/252; 704/256; 704/E15.05; 381/94.7; 381/94.1
(58) Field of Classification Search ............ 704/252, 704/E15.039, 256, E15.05; 381/94.7, 94.1
See application file for complete search history.

(56) References Cited

U.S. PATENT DOCUMENTS

| | | | | |
|---|---|---|---|---|
| 4,587,620 A | * | 5/1986 | Niimi et al. ............... 702/193 |
| 4,905,286 A | * | 2/1990 | Sedgwick et al. .......... 704/233 |
| 5,097,509 A | * | 3/1992 | Lennig ..................... 704/240 |
| 5,390,278 A | * | 2/1995 | Gupta et al. ............... 704/243 |
| 5,450,523 A | * | 9/1995 | Zhao ........................ 704/243 |
| 5,590,242 A | * | 12/1996 | Juang et al. ............... 704/245 |
| 5,610,991 A | * | 3/1997 | Janse ......................... 381/92 |
| 5,675,704 A | * | 10/1997 | Juang et al. ............... 704/246 |
| 5,687,287 A | * | 11/1997 | Gandhi et al. ............. 704/247 |
| 5,727,124 A | * | 3/1998 | Lee et al. .................. 704/233 |
| 5,778,342 A | * | 7/1998 | Erell et al. ............... 704/256.8 |
| 5,854,999 A | * | 12/1998 | Hirayama .................. 704/226 |
| 5,857,169 A | * | 1/1999 | Seide ..................... 704/256.7 |
| 5,860,062 A | * | 1/1999 | Taniguchi et al. .......... 704/256 |
| 5,864,810 A | * | 1/1999 | Digalakis et al. ........... 704/255 |
| 5,978,763 A | * | 11/1999 | Bridges .................... 704/233 |
| 6,026,359 A | * | 2/2000 | Yamaguchi et al. ....... 704/256.4 |
| 6,044,340 A | * | 3/2000 | Van Hamme .............. 704/226 |
| 6,064,959 A | * | 5/2000 | Young et al. .............. 704/251 |
| 6,067,513 A | * | 5/2000 | Ishimitsu .................. 704/233 |
| 6,076,057 A | * | 6/2000 | Narayanan et al. ....... 704/256.2 |
| 6,173,258 B1 | * | 1/2001 | Menendez-Pidal et al. .. 704/233 |
| 6,188,982 B1 | * | 2/2001 | Chiang ................... 704/256.5 |
| 6,202,047 B1 | * | 3/2001 | Ephraim et al. .......... 704/256.6 |
| 6,223,155 B1 | * | 4/2001 | Bayya ...................... 704/243 |
| 6,606,595 B1 | * | 8/2003 | Chengalvarayan et al. ................... 704/256.5 |
| 6,662,160 B1 | * | 12/2003 | Chien et al. ................ 704/256 |

(Continued)

OTHER PUBLICATIONS

L. Deng, M. Aksmanovic, D. Sun, and J. Wu, "Speech recognition using hidden Markov models with polynomial regression functions as nonstationary states," IEEE Trans. Speech Audio Process. 2, 507-520 (1994).*

(Continued)

*Primary Examiner*—Talivaldis I Smits
*Assistant Examiner*—Greg A Borsetti
(74) *Attorney, Agent, or Firm*—Chapin IP Law, LLC; Barry W. Chapin, Esq.

(57) ABSTRACT

A method for automatic speech recognition includes determining for an input signal a plurality scores representative of certainties that the input signal is associated with corresponding states of a speech recognition model, using the speech recognition model and the determined scores to compute an average signal, computing a difference value representative of a difference between the input signal and the average signal, and processing the input signal in accordance with the difference value.

21 Claims, 1 Drawing Sheet

U.S. PATENT DOCUMENTS

| | | | |
|---|---|---|---|
| 6,915,259 B2* | 7/2005 | Rigazio et al. | 704/244 |
| 6,980,952 B1* | 12/2005 | Gong | 704/234 |
| 7,062,433 B2* | 6/2006 | Gong | 704/226 |
| 7,089,182 B2* | 8/2006 | Souilmi et al. | 704/234 |
| 7,089,184 B2* | 8/2006 | Rorex | 704/255 |
| 7,292,974 B2* | 11/2007 | Kemp | 704/234 |
| 7,440,891 B1* | 10/2008 | Shozakai et al. | 704/233 |
| 7,539,616 B2* | 5/2009 | Zhang et al. | 704/233 |
| 2002/0165713 A1* | 11/2002 | Skoglund et al. | 704/240 |
| 2002/0173953 A1* | 11/2002 | Frey et al. | 704/226 |
| 2003/0061042 A1* | 3/2003 | Garudadri | 704/254 |
| 2003/0088411 A1* | 5/2003 | Ma et al. | 704/236 |
| 2003/0115047 A1* | 6/2003 | Mekuria | 704/219 |
| 2003/0115055 A1* | 6/2003 | Gong | 704/233 |
| 2004/0199382 A1* | 10/2004 | Bazzi et al. | 704/209 |
| 2004/0199384 A1* | 10/2004 | Hong | 704/233 |
| 2005/0273325 A1* | 12/2005 | Frey et al. | 704/226 |
| 2006/0095260 A1* | 5/2006 | Cho et al. | 704/243 |

OTHER PUBLICATIONS

F. Liu, R. Stern, X. Huang, and A. Acero. Ecient cepstral normalization for robust speech recognition. In Proc. ARPA Human Language Technologies Workshop, 1993.*

B. Carlson and M. Clements, Speech recognition in noise using a projection-based likelihood measure for mixture density HMM's. In: IEEE Internat. Conf. Acoust. Speech Signal Process.-92 (1992), pp. 237-240.*

Fousek et al. "Additive Noise and Channel Distortion-Robust Parametrization Tool—Performance Evaluation on Aurora 2 & 3" Eurospeech 2003.*

Pellom et al. "Recent Improvements in the CU Sonic ASR System for Noisy Speech: The Spine Task" ICASSP 2003.*

O. Viikki, K. Laurila, "Noise Robust HMM-based Speech Recognition Using Segmental Cepstral Feature Vector Normaliztion", ESCA-NATO Workshop on Robust Speech Recognition for Unknown Communication Channels, Pont-à-Mousson, France, pp. 107-110, 1997.*

Abdou et al. "Beam search pruning in speech recognition using a posterior probability-based confidence measurs", 2004.*

Liu et al. "Environment Normalization for Robust Speech Recognition Using Direct Cepstral Comparison" 1994.*

Beattie et al. "Hidden Markov Model State-Based Cepstral Noise Compensation" 1992.*

Chien et al. "Estimation of Channel Bias for Telephone Speech Recognition" 1996.*

Liao et al. "Bandwidth Mismatch Compensation for Robust Speech Recognition" 2003.*

Lee. "On stochastic feature and model compensation approaches to robust speech recognition" 1998.*

Wong. "State-based Cepstral Domain Compensation for Improved Noisy speech Recognition" 1992.*

Barreaud et al. "On-Line Compensation for Non-Stationary Noise" 2003.*

Vaseghi et al. "Noise Compensation Methods for Hidden Markov Model Speech Recognition in Adverse Environments" 1997.*

Yao et al. "Model-based Noisy Speech Recognition with Environment Parameters Estimated by Noise Adaptive Speech Recognition with Prior" 2003.*

H. Bourlard. "Optimizing recognition and rejection performance in wordspotting systems", Proceedings ICASSP, vol. I, pp. 373-376, 1994.

J. Haekkinen et al. "Improved feature vector normalization for noise robust connected speech recognition", Proceedings Eurospeech, pp. 2833-2836, 1999.

A. Lavie et al. "Janus-III: Speech-to-speech translation in multiple languages", Proceedings ICASSP, vol. I, pp. 99-102, 1997.

L. R. Rabiner. "A Tutorial on Hidden Markov Models and Selected Applications in Speech Recognition". Proceedings of the IEEE, 77(2):257-286, Feb. 1989.

S. Young, "HTK book for HTK Version 3.2.1", Microsoft Corp., pp. 58-66, Dec. 2002.

* cited by examiner

SPEECH RECOGNITION USING CHANNEL VERIFICATION

TECHNICAL FIELD

This invention relates to speech recognition, and in particular to automatic speech recognition systems that are deployed in noisy environments.

BACKGROUND

The recognition performance of automatic speech recognition systems can seriously degrade in noisy acoustic environments. One source of degradation includes environmental sounds that get mistaken as speech sounds, leading to errors that may include so-called insertions. Some of these insertions can be prevented by training specific non-speech models for various environmental sounds (like the slamming of doors, barking of dogs, etc.) and running these models in parallel to the actual speech and silence models during recognition. Another technique is to train so-called garbage models from generic speech. This allows garbage models to not only reject some non-speech events but also out-of-vocabulary speech.

However, both of the above approaches may lose in their effectiveness in situations where the acoustic environment includes another person that is speaking in-vocabulary words in the background. This scenario occurs, for example, when a dictation system is used on a mobile device.

SUMMARY

In one aspect, a method for automatic speech recognition includes determining for an input signal a plurality of scores representative of certainties that the input signal is associated with corresponding states of a speech recognition model, using the speech recognition model and the determined scores to compute an average signal, computing a difference value representative of a difference between the input signal and the average signal, and processing the input signal in accordance with the difference value.

Embodiments may include one or more of the following:

The certainties that the input signal is associated with corresponding states of a speech recognition model comprise probabilities.

Processing the input signal in accordance with the difference value includes performing speech recognition using the input signal if the difference value does not exceed a first predetermined threshold.

Processing the input signal in accordance with the difference value includes adjusting one or more of the plurality of scores based on the difference value, and using the adjusted scores to update the speech recognition.

Applying to the input signal a cepstrum transformation, and generating a mel-frequency cepstral representation comprising mel-frequency coefficients from the cepstrum transform representation of the input signal. The average signal is represented using a corresponding mel-frequency cepstral representation, and computing the difference value includes computing a channel deviation value based on the difference between the $0^{th}$ dimension of the mel-frequency cepstral coefficient of the mel-cepstral frequency representation of input signal and the $0^{th}$ dimension mel-frequency cepstral representation of the average signal.

Computing the average signal includes identifying from the plurality of scores a best score, selecting from the plurality of scores those scores whose corresponding values are within a second predetermined threshold from the value of the best score, and performing an averaging operation on the observation mean vectors of observation densities associated with the selected scores to obtain the average signal.

Determining the plurality of scores includes performing a negative logarithmic operation on each of the certainties associated with the corresponding states.

The states of the speech recognition model include hidden Markov model states.

The one or more of the plurality of scores correspond to, for example, a state of silence, and/or a state of background noise.

In another aspect, a computer program product for automatic speech recognition, the computer program product residing on a machine-readable medium for storing computer instructions that, when executed, cause a processor-based machine to determine for an input signal a plurality scores representative of certainties that the input signal is associated with corresponding states of a speech recognition model, use the speech recognition model and the determined scores to compute an average signal, compute a difference value representative of a difference between the input signal and the average signal, and process the input signal in accordance with the difference value.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
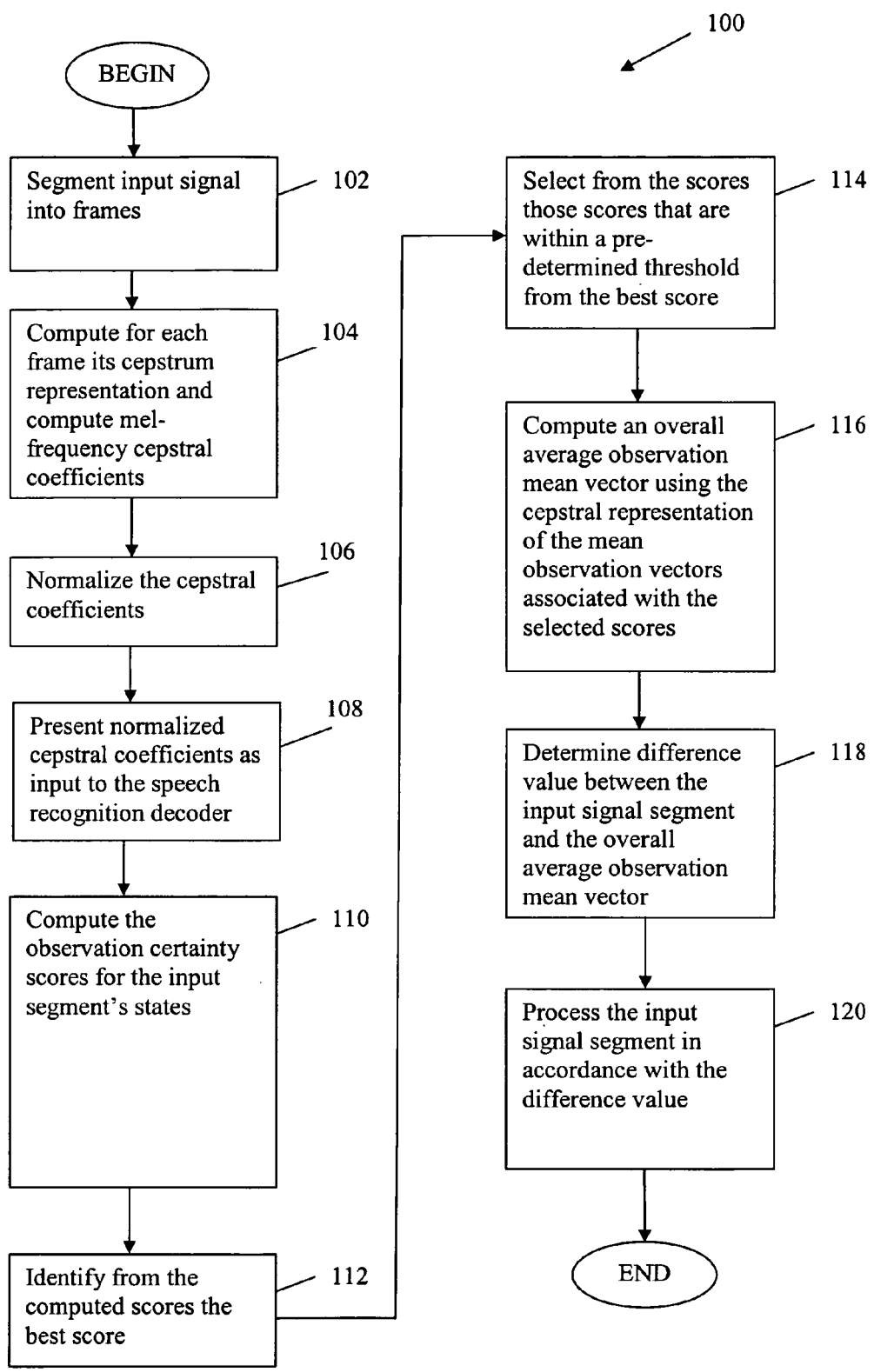
FIG. 1 is a flowchart of an exemplary embodiment of a speech recognition procedure.

An approach to reduction of noise-induced insertions by an automatic speech recognition system uses the fact that the channel between the microphone and the recognition user (such a channel is often referred to as the "speech channel") is different from the one between the microphone and the origin of the background noises (referred to as the "noise channel"). For example, the channel for the background noise may represent greater attenuation or different spectral shape than that for the user. In a general sense, the approach assesses whether or not the acoustics of a sound are consistent with a speech sound that has passed through the speech channel as opposed to the noise channel, and generates a difference measure based on that assessment. The input signal segment is subsequently processed based on that difference measure.

For example, in some embodiments the generated difference measure is compared to a predetermined threshold. If the difference measure exceeds that threshold no further speech recognition operations (e.g., Viterbi search operations) are performed on the input signal segment. In another example, the difference measure is used to adjust scores associated with various states of the speech recognition model employed in conjunction with the speech recognition system. In some embodiments, if the approach determines that a segment of an acoustic input signal is inconsistent with signals received through the speech channel, the method biases scores of the noise state(s) associated with the speech recognition model to increase the probability that an observed acoustic input sequence will be deemed to be noise. In some embodiments, the scores of the states associated with actual speech are biased so as to reduce the probability that an observed acoustic input sequence will be deemed to be speech.

In some examples, the approach disclosed herein is used in conjunction with a conventional speech recognition system that includes processor-based devices executing a software implementation of hidden Markov models (hereinafter "HMM") configured to perform speech recognition operations. Specifically, an acoustic input signal is processed to form a series of acoustic segments that are provided as input to a speech recognition system. A signal processing component of the speech recognition system transforms the input signal for each segment into an "observation" compatible with the HMM (e.g., such an observation could be represented as a vector of real values). For example, in some embodiments the acoustic input signal segments are transformed into a frequency-based representation, such as a cepstrum representation, mel-frequency cepstral representation, filter bank representation, etc. The formation of a feature vector can include a normalization function that removes the effect of the channel from the user to the microphone. For example, in the case of cepstra, a moving average of the computed cepstra are subtracted from the cepstra for each frame. The transformed features of the input signal subsequently undergo speech recognition processing using, for example, HMM.

In some embodiments, a Viterbi algorithm is used to determine from the HMM the single best state sequence for a given observation sequence. As explained, for example, in Lawrence R. Rabiner "A Tutorial on Hidden Markov Models and Selected Applications in Speech Recognition" (Proceedings of the IEEE, Vol. 77, No. 2, February 1989, pp. 257-286), the observation sequence and the corresponding best state sequence may be represented respectively as:

$$O=\{O_1, O_2, \ldots, O_T\} \quad (1)$$

$$Q=\{q_1, q_2, \ldots, q_T\} \quad (2)$$

The best score (i.e., highest probability) along a single path that accounts for the first T observations is defined as:

$$\delta_T(i) = \max P[q_1, q_2, \ldots, q_{T=i}, O_1, O_2, \ldots, O_T | \lambda] \quad (3)$$

where $\lambda$ is the complete parameter set of the model and the max is taken over all state sequences $q_1, \ldots, q_{T=i}$.

It can be shown that the score for a sequence that includes the state j for the observation at time T+1 is equal to:

$$\delta_{T+1}(j) = \left[\max_i \delta_T(i) a_{ij}\right] \cdot b_j(O_{T+1}) \quad (4)$$

allowing $\delta_T$ to be computed iteratively as observations are made available.

It is to be noted that in some embodiment the score for the sequence is computed as a logarithmic, or negative logarithmic value. Subsequent computations based on the computed scores are likewise performed in a logarithmic domain. Thus, Equation (4) is expressed in the logarithmic domain as $-\log(\delta_{T+1}(j)) = \min(-\log(\delta_T(i)a_{ij}-\log(b_j(O_{T+1})))$.

In other words, the score corresponding to a sequence of observations culminating with an observation at time T+1 is equal to the sum of the best (i.e., minimum) score of the first T observations and the score that a state j, as determined from the observation's state probability density, is the state selected for the observation at T+1 given the first T observations that preceded it. Accordingly, the best score, and thus the most likely sequence of states for the first T+1 observation, is the one that includes the state j having the highest probability for the observation at T+1.

The determined best score, and thus the probable state sequence corresponding to a sequence of observations, can be manipulated by adjusting the probability of the observation given the different possible states. Consequently, the on-going determination of the state sequence and corresponding computation of the best score $\delta_T$ can be biased so that the selected state for the current and subsequent observations may be different than what otherwise would have been selected without the adjustment of the probabilities. For example, if it is determined that the characteristics of received acoustic signals are inconsistent with "speech channel" signals (e.g., the acoustic signals may have originated from a second speaker whose speech is picked up and processed by the speech recognition system), the probability or score associated with the observation given the silence state may be increased notwithstanding that ordinarily the speech recognition system would have been able to discern the acoustic input signal as intelligible speech.

In the above example, if it is determined that the input signal $O_{T+1}$ is not consistent with the channel from the user to the microphone, the probability $b(O_{T+1})$ for the states associated with noise or background is increased (e.g., by scaling by a factor, or equivalently, $-\log b(O_{T+1})$ is increased by an additive factor), while the probabilities associated with the other states remain unchanged. For example, if $q_1$ is a state associated with background noise, $b_1(O_{T+1})$ is increased. If there are additional states associated with noise, silence and/or background noises, the scores for those states may likewise be increased. Alternatively, the probabilities of observations given states associated with speech by the first speaker (i.e., signal received via the speech channel) may be decreased to thereby similarly bias the speech recognition system to select states associated with noise, silence and/or background. The extent of the adjustment of the scores may be based on a computed value (i.e., a correction factor) indicative of the level of inconsistency between the signal received and the normal characteristics of speech channel signals.

By adjusting the scores associated with states rather than applying, for example, binary decision logic on a frame-by-frame basis, better noise rejection performance is achieved by taking advantage of a decoder's strength of aligning acoustical frames on a word-level scale.

FIG. 1 is a flowchart of an exemplary embodiment of a speech recognition procedure 100 that performs channel verification and controls the subsequent processes of the speech recognizer based on the results of the channel verification.

A received acoustic input signal is segmented at 102 into frames. In some embodiments the signal is segmented into 50% overlapping frames of 25 ms duration.

Each frame is represented as a cepstrum vector (104) by so-called mel-frequency cepstral coefficients (MFCC). These coefficients are computed by applying the following exemplary signal processing operations.

Each frame is digitized using an analog-to-digital converter at a sampling rate of, for example, 8 kHz resulting in a digital waveform s(n) of N=200 samples. This waveform is pre-emphasized according to:

$$preem[n] = s[n] - s[n-1] \quad (5)$$

and multiplied by a Hamming window $$window[n] = 0.54 - 0.46 \cdot \cos\left(\frac{2\pi(n-1)}{N-1}\right) \quad (6)$$

Next, the windowed signal is zero-padded with 56 samples, transformed by a 256-point Fast Fourier Transform (FFT), and the magnitude is taken. The FFT magnitude coefficients are then correlated with M=24 triangular filters which are equally spaced along the mel-scale between 0 Hz and 4 kHz. The mel-scale is defined by $$Mel(f) = 2595 \cdot \log_{10}\left(1 + \frac{f}{700}\right) \quad (7)$$

Next, the logarithm of the filter values is taken producing M logarithmic filterbank amplitudes $m_j$. The MFCCs are finally obtained by applying a Discrete Cosine Transform to the logarithmic filterbank amplitudes $$MFCC[i] = \sum_{j=1}^{M} m_j \cdot \cos\left(\frac{\pi \cdot i(j - 0.5)}{M}\right) \text{ for } i = 0 \text{ to } 12 \quad (8)$$

In addition to MFCCs, the MFCCs' first and second order time derivatives may also be computed at 104. The coefficients for the first order time derivative are based on simple differences between the MFCCs of the immediately succeeding and preceding frames. Thus, for example:

$$\Delta MFCC[t] = MFCC[t+1] - MFCC[t-1] \quad (9)$$

A similar operation is applied to obtain the second order time derivatives from the first order time derivatives:

$$\Delta\Delta MFCC[t] = \Delta MFCC[t+1] - \Delta MFCC[t-1] \quad (10)$$

The thirteen (13) basic static MFCCs are combined with their first and second order time derivatives to form a 39-dimensional cepstrum representation.

$$\text{cepstrum} = (MFCC, \Delta MFCC, \Delta\Delta MFCC) \quad (11)$$

The computed mel-frequency cepstral coefficients for the segment of the input signal being processed are then normalized at 106. Particularly, for each of the 39 dimensions of the cepstrum representation the mean value μ and the variance σ² are computed on an on-going basis based on past frames. Techniques for computing estimates of the cepstral mean and variance values are known to those versed in the art. The resultant normalized coefficients, denoted feature[i], are thus defined as:

$$\text{feature}[1] = \frac{\text{cepstrum }[i] - \mu[i]}{\sigma[i]} \text{ for } i - 0 \text{ to } 38 \quad (12)$$

The normalization of the cepstral coefficients enables the removal of a stationary and linear speech channel μ[i], which depends on the vocal tract of the user and the user to microphone channel, while the cepstral variance normalization provides at least partial compensation for the reduction of the variance of the cepstral coefficients due to additive noise.

It will be appreciated that each frame of the input signal may be represented using other types of representations, including other types of frequency-based representations.

Having normalized the cepstral coefficients to obtain feature[i], the speech recognition operations, including the channel verification and score correction procedure can be performed.

Accordingly, the normalized cepstral coefficients, feature[i], are presented at 108 as the input to the decoder of the speech recognition system. The normalized coefficients, feature[i], represent the observation corresponding to the current segment being processed.

As explained above with respect to Equation (4), the observation at T+1 is associated with the observation probability represented as $b_j(O_{T+1})$, where j corresponds to the various possible states associated with the observation. Each state models the observation probabilities by its own probability density function. In some embodiments, observation probabilities are modeled by a mixture of multivariate Gaussian densities N(O,η,Σ):

$$b_j(O_{T+1}) = \sum_{k=1}^{K} c_{jk} \cdot N\left(O_{T+1}, \eta_{jk}, \sum_{jk}\right) \quad (13)$$

where $\eta_{jk}$ is the mean vector of the k-th Gaussian mixture component (i.e., the k-th component mean) of state j, $\Sigma_{jk}$ is the covariance matrix of the k-th Gaussian mixture component of state j, and $c_{jk}$ is the k-th mixture weight of state j. In some embodiments, the sum over all Gaussian mixture components is approximated by the single most likely Gaussian mixture component:

$$b_j(O_{T+1}) \approx \max c_{jk} \cdot N(O_{T+1}, \eta_{jk}, \Sigma_{jk}) \quad (14)$$

It is instructive to note that with this approximation, the component mean $\eta_{jk}$ of the most likely mixture component represents the expected value (and also the most likely observation vector) for this mixture. In other words, averaging all observations associated with state j will result in its component mean.

The component mean vector has a representation and dimensionality that is compatible with the representation and dimensionality of the normalized coefficients of feature[i], thereby enabling the coefficients of feature[i] to be compared to the representations of the acoustic signals associated with each of the component means.

The observation probability of the cepstral vector is computed at 110 for each of the states of the hidden Markov model (HMM). The computed scores reflect the probability that the cepstral vector represent the corresponding sounds associated with each of the states.

In some embodiments the scores are computed as the negative logarithm of the probability of the corresponding state (i.e., score=$-\log(P(b_j(O_{T+1}))$). Since the range for probabilities is 0 to 1, the range of the scores using the negative logarithm computation is infinity (∞) to 0. Thus, using this scoring methodology, states having a high probability will be mapped to low score values, whereas low probability states will be mapped to high score values.

The speech recognition system next identifies at 112 the best score and thus identifies the state with respect to which the cepstral vector had the best score. The best scoring state represents a good acoustic match for the given acoustic frame.

The speech recognition system at 114 identifies a set of states from the computed scores whose scores are within a pre-determined threshold from the identified best score.

The component mean vectors corresponding to observation densities for the selected states that are determined to be within the pre-determined threshold from the best score are then averaged at 116 to obtain an overall average observation mean vector. Specifically, an averaging operation is performed individually with respect to each coefficient of the selected component mean vectors to obtain the average component mean vector. To facilitate subsequent processing based on the feature[i] vector and the component mean vectors, the coefficients of the component mean vectors are represented in a representation that is compatible with the representation of the values of feature[i] vector. Thus, in some embodiments the coefficients of the component mean vectors are represented as normalized mel-frequency cepstral coefficients. In some examples only one (or possibly a small subset) of the dimensions of the observation vector are used. For example, only feature[0] corresponding to the $0^{th}$ dimension of the cepstral representation may be used.

To obtain the average component mean vector, the first normalized mel-frequency cepstral coefficient of all the selected component mean vectors is averaged to produce a resultant average first normalized mel-frequency cepstral coefficient. Similarly, the second normalized mel-frequency cepstral coefficient of all the selected component mean vectors is used to obtain an average second normalized mel-frequency cepstral coefficient, and likewise the remaining normalized mel-frequency cepstral coefficients and their first and second order time derivatives are averaged, thereby producing the overall average component mean vector, $\gamma[i]$, which includes averaged normalized mel-frequency cepstral coefficients.

The resulting average component mean vector $\gamma[i]$ represents an estimate of the sound that has passed through the speech channel based on the speech recognition models. The difference between the cepstral vector of the input signal segment and the average component mean vector is thus indicative of the inconsistency, or deviation, of the actual channel from the speech channel (normalized by the cepstral variance). The larger this inconsistency is, the less likely it is that the input signal segment being processed passed through the speech channel. In other words, a large difference value between the cepstral vector of the input signal segment and the average component mean vector is indicative that the input signal segment being processed may have originated from the "noise channel". This difference value, therefore, effectively provides a channel verification mechanism to determine if the input signal segment passed through the speech channel. Accordingly, a difference measure, or value, between the input signal, represented in terms of normalized mel-frequency cepstral coefficients, and the average component mean vector $\gamma[i]$ is determined at 118.

One metric that can be computed to represent the difference measure between the cepstral vector of the input signal segment and the average component mean is the channel deviation metric which is defined, with respect to each vector dimension, as:

$$\text{channelDeviation}[i]=(\text{feature}[i]-\gamma[i])\cdot\sigma[i] \quad (15)$$

The resultant channel deviation measure is thus a vector representative of the differences between each of the mel-frequency cepstral coefficients of the input signal segment and the respective mel-frequency cepstral coefficients of the computed average component mean vector. The differences are multiplied by the cepstral variances $\sigma[i]$ in order to undo the division by the cepstral variances that was used to derive the normalized cepstral representation of the signal (see Equation (12)). Channel deviation values that are not scaled by the cepstral variance $\sigma[i]$ may cause disproportionately large channel deviations in environments with large additive noise. It will be noted that other measures reflective of the difference between the cepstral vector of the input signal segment and the average component mean vector may be used.

Because the recognition user tends to be physically a lot closer to the microphone compared to other extraneous noise sources, the difference between the speech channel and the noise channel is particularly pronounced for the $0^{th}$ cepstral dimension, the frame energy. Higher cepstral dimensions of the estimated channel deviation may be dominated by other factors such as errors in the channel estimate and phonetic variability. Accordingly, for the purposes of channel verification, using estimation of the channel deviation for the $0^{th}$ cepstral dimension may be sufficient. Thus, the channel deviation value that may be used to control the subsequent processing of the input signal is computed as:

$$\text{channelDeviation}[0]=(\text{feature}[0]-\gamma[0])\cdot\sigma[0] \quad (16)$$

It will be appreciated that in computing the channel deviation metric, or other type of metrics, additional cepstral dimensions (where cepstral representation of the signals and of the acoustic component associated with the various states are used) may be used.

Having determined the difference value, the input signal is processed at 120 in accordance with the difference value.

Particularly, in one embodiment, the magnitude of the channel deviation is compared to a predetermined threshold value (e.g., a "noise threshold" value) to reach a quick decision as to whether the current acoustic segment passed through the speech channel, and thus determine whether to include the input signal segment in the Viterbi search for the single best state sequence. An exemplary decision logic is:

if |channelDeviation[0]|<threshold, then include segment in Viterbi search else skip segment in Viterbi search The threshold may be determined based on prior recognition experiments and tuned so as to provide the best trade-off between noise suppression and deletion of valid speech segments. It will be noted that other measures reflective of the magnitude of the channel deviation may be used.

In another embodiment, the channel deviation value is used to adjust the scores associated with speech recognition states. After the difference measure, such as channelDeviation[0], has been determined, the observation scores for one or more of the speech recognition model states corresponding to the current input signal segment are adjusted. For example, in embodiments in which it is the silence score (e.g., $-\log b_1(O_T)$) which is adjusted, the new silence score can be calculated from the difference metric and the unadjusted initial score for the model's silence state as follows:

$$\text{newSilenceScore}=\text{oldSilenceScore}-a\cdot(\text{channelDeviation}[0])^2 \quad (17)$$

where a is a scaling constant and oldSilenceScore is the initial pre-adjusted score for the silence state of the model. It will be recalled that oldSilenceScore is computed, in some embodiments, as $-\log(b_1(O_{T+1}))$, where $b_1(O_{T+1})$ is the probability of the observation at T+1, given the state is $q_1$ for the T+1 observations. The scaling constant a may be determined based on prior recognition experiments and tuned so as to provide the best trade-off between noise suppression and deletion of valid speech segments. As noted above, the scores associated with other states may be also adjusted based on the difference value, and such adjustment may be computed differently than as shown in the above equation.

The effect of the above silence score modification is that the silence model is subsequently more likely to win against competing speech models whenever acoustic frames exhibit energies that deviate from the expected energies for the particular speech sounds. However, because acoustic frame energies generally deviate from the expected energies because the expected energies are long-term averages rather than instantaneous values, the term $(\text{channelDeviation}[0])^2$ will generally have a non-zero value. As a result, the adjusted scores, including the silence score of the silence model will consequently become progressively more likely even in situations where there are no interfering noises. To reduce the undesired effect of continuously biasing the adjusted scores every frame such that they progressively become more likely, an alternative computation to adjust the model's scores may be used. For example, to adjust the silence score, the following computation may be implemented:

$$\text{newSilenceScore} = \text{oldSilenceScore} + a \cdot \text{channelDeviation}[0] \cdot |\text{channelDeviation}[0]| \quad (18)$$

Thus, unlike Equation 17, in the relationship described by Equation 18 the silence score can be increased or decreased, and therefore if the long term behavior of the input signal segment is that it is generally close to the expected energies as reflected by the $0^{th}$ dimension of the cepstral representation of the average component mean, the adjusted silence state of the model will not progressively become more likely over time.

The scores, whether or not adjusted, for the various states corresponding to the current input signal segment are used to select the proper state that will be used to continuously determine the state sequence for the observations that are presented to the speech recognition system. In some embodiments the state having the best score (i.e., the most likely state from a probabilistic perspective) is selected. The state for the next observation will thus be selected by finding the best state given the up-to-date sequence of states which includes the state selected using the channel verification methodology described herein. Selection of the next state in the sequence for the next observation may also be done by first performing channel verification operations, adjusting scores accordingly and selecting the state having the "best" score, as described herein Other Embodiments The methods and systems described herein are not limited to a particular hardware or software configuration, and may find applicability in many computing or processing environments. The methods and systems can be implemented in hardware, or a combination of hardware and software, and/or can be implemented from commercially available modules applications and devices. Where the implementation of the systems and methods described herein is at least partly based on use of microprocessors, the methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

A number of embodiments of the invention have been described. Nevertheless, it will be understood that various modifications may be made without departing from the spirit and scope of the invention. For example, different measures indicative that the acoustic input signal did not pass through the speech channel may be used. Additionally, different representations of the signals may be used in performing the speech recognition operations, including other types of frequency-based representation other than the cepstrum representation and/or mel-frequency cepstral representation described herein.

Accordingly, other embodiments are within the scope of the following claims.

What is claimed is:

1. A method for automatic speech recognition, the method comprising:
  determining for an input signal a plurality of scores representative of certainties that the input signal is associated with corresponding states of a speech recognition model;
  using the speech recognition model and the determined scores to compute an average signal;
  computing, via a processor device executing instructions, a difference value representative of a difference between the input signal and the average signal; and
  processing, via the processor device, the input signal in accordance with the difference value;
  wherein computing the average signal comprises:
    identifying a given score from the plurality of scores;
    selecting from the plurality of scores a set of scores whose corresponding values are within a predetermined threshold from a value of the given score; and performing an averaging operation on observation mean vectors of observation densities associated with the selected plurality of scores to obtain the average signal.

2. The method of claim 1, wherein processing the input signal in accordance with the difference value comprises:
performing speech recognition using the input signal if the difference value does not exceed a first predetermined value.

3. The method of claim 1, wherein processing the input signal in accordance with the difference value comprises:
adjusting the plurality of scores based on the difference value; and
using the adjusted scores to update the speech recognition model.

4. The method of claim 3, further comprising:
applying to the input signal a cepstrum transformation; and
generating a mel-frequency cepstral representation comprising mel-frequency coefficients from the cepstrum transform representation of the input signal.

5. The method of claim 4, wherein the average signal is represented using a corresponding mel-frequency cepstral representation, and wherein computing the difference value comprises:
computing a channel deviation value based on a difference between a $0^{th}$ dimension of a mel-frequency cepstral coefficient of the mel-cepstral frequency representation of input signal and a $0^{th}$ dimension mel-frequency cepstral representation of the average signal.

6. The method of claim 1, wherein determining the plurality of scores includes:
performing a negative logarithmic operation on each of the certainties associated with the corresponding states.

7. A method for automatic speech recognition, the method comprising:
determining for an input signal a plurality of scores representative of certainties that the input signal is associated with corresponding states of a speech recognition model;
using the speech recognition model and the determined scores to compute an average signal;
computing, via a processor device executing instructions, a difference value representative of a difference between the input signal and the average signal;
processing, via the processor device, the input signal in accordance with the difference value;
wherein processing the input signal in accordance with the difference value comprises: performing speech recognition using the input signal if the difference value does not exceed a first predetermined threshold; and
wherein computing the average signal comprises:
identifying from the plurality of scores a best score;
selecting from the plurality of scores those scores whose corresponding values are within a second predetermined threshold from a value of the best score; and
performing an averaging operation on observation mean vectors of observation densities associated with the selected scores to obtain the average signal.

8. A computer program product for automatic speech recognition, the computer program product stored on a non-transitory machine readable storage medium for storing computer instructions that, when executed, cause a processor-based machine to:
determine for an input signal a plurality of scores representative of certainties that the input signal is associated with corresponding states of a speech recognition model;
use the speech recognition model and the determined scores to compute an average signal;
compute a difference value representative of a difference between the input signal and the average signal; and
process the input signal in accordance with the difference value;
execution of the instructions further causing the processor-based machine to compute the average signal via steps of:
identifying a given score from the plurality of scores;
selecting from the plurality of scores a set of scores whose corresponding values are within a predetermined threshold from a value of the given score; and
performing an averaging operation on observation mean vectors of observation densities associated with the selected plurality of scores to produce the average signal.

9. The computer program product of claim 8, wherein the instructions that cause the processor-based machine to process the input signal in accordance with the difference value comprise instructions that, when executed, cause the processor-based machine to:
perform speech recognition using the input signal if the difference value does not exceed a first predetermined value.

10. The computer program product of claim 8, wherein the instructions that cause the processor-based machine to process the input signal in accordance with the difference value comprise instructions that, when executed, cause the processor-based machine to:
adjust the plurality of scores based on the difference value; and
use the adjusted scores to update the speech recognition model.

11. The computer program product of claim 10, further comprising instructions that when executed cause the processor-based machine to:
apply to the input signal a cepstrum transformation; and
generate a mel-frequency cepstral representation comprising mel-frequency coefficients from the cepstrum transform representation of the input signal.

12. The computer program product of claim 11, wherein the average signal is represented using a corresponding mel-frequency cepstral representation, and wherein the instructions that that cause the processor-based machine to compute the difference value comprise instructions that when executed cause the processor-based machine to:
compute a channel deviation value based on a difference between a $0^{th}$ dimension of a mel-frequency cepstral coefficient of the mel-cepstral frequency representation of input signal and a $0^{th}$ dimension mel-frequency cepstral representation of the average signal.

13. A computer program product for automatic speech recognition, the computer program product stored on a non-transitory machine readable storage medium for storing computer instructions that, when executed, cause a processor-based machine to:
determine for an input signal a plurality of scores representative of certainties that the input signal is associated with corresponding states of a speech recognition model;
use the speech recognition model and the determined scores to compute an average signal;
compute a difference value representative of a difference between the input signal and the average signal; and
process the input signal in accordance with the difference value;

wherein the instructions that cause the processor-based machine to compute the average signal comprise instructions that, when executed, cause the processor-based machine to:

identify from the plurality of scores a best score;

select from the plurality of scores those scores whose corresponding values are within a second predetermined threshold from a value of the best score; and perform an averaging operation on observation mean vectors of observation densities associated with the selected scores to obtain the average signal.

14. The method as in claim 1 further comprising:

segmenting the input signal into frames;

computing a respective coefficient for each of the frames;

normalizing the coefficients associated with the frames;

presenting the normalized coefficients to a speech recognition decoder; and computing the plurality of scores using the normalized coefficients.

15. The method as in claim 14, wherein the scores are probability scores, the method further comprising:

selecting a subset of scores from the probability scores;

generating the average signal based on the subset of scores; and adjusting the plurality of scores based on the average signal.

16. The method as in claim 15 further comprising:

utilizing the adjusted plurality of scores to determine whether the input signal represents sound on a noise channel or sound on a speech channel.

17. The method as in claim 1, wherein processing the input signal in accordance with the difference value includes:

adjusting the plurality of scores based on the average signal; and utilizing the adjusted plurality of scores to determine whether or not the input signal represents sound on a noise channel or sound on a speech channel.

18. The method as in claim 1 further comprising:

determining that the input signal represents sound on a noise channel, as opposed to sound on a speech channel, based on a magnitude of the difference value.

19. The method as in claim 1 further comprising:

in response to determining that a segment of the input signal is inconsistent with signals normally received through a speech channel, biasing scores of noise states associated with the speech recognition model to increase a probability that the segment of the input signal is deemed to be sound received on a noise channel rather than sound received on the speech channel.

20. The method as in claim 19 further comprising:

detecting that the segment is received on the noise channel in response to detecting that the difference value is above a threshold.

21. The method as in claim 1, wherein the scores are probability scores associated with states of the input signal and wherein the average signal is a moving average generated based on the input signal, the method further comprising:

biasing scores of noise states associated with the speech recognition model to increase a probability that a segment of the input signal is deemed to be sound received on a noise channel rather than sound received on a speech channel.

* * * * *